United States Patent
Eyer

(10) Patent No.: US 10,491,965 B2
(45) Date of Patent: Nov. 26, 2019

(54) METHOD, COMPUTER PROGRAM, AND RECEPTION APPARATUS FOR DELIVERY OF SUPPLEMENTAL CONTENT

(71) Applicant: SATURN LICENSING LLC., New York, NY (US)

(72) Inventor: Mark Eyer, Woodinville, WA (US)

(73) Assignee: SATURN LICENSING LLC., New York, NY (US)

( * ) Notice: Subject to any disclaimer, the term of this patent is extended or adjusted under 35 U.S.C. 154(b) by 0 days.

(21) Appl. No.: 15/493,977

(22) Filed: Apr. 21, 2017

(65) Prior Publication Data

US 2017/0311038 A1    Oct. 26, 2017

Related U.S. Application Data

(63) Continuation of application No. 14/704,554, filed on May 5, 2015, now Pat. No. 9,635,439, which is a (Continued)

(51) Int. Cl.
*H04N 21/81* (2011.01)
*H04H 60/13* (2008.01)
(Continued)

(52) U.S. Cl.
CPC ........ *H04N 21/8133* (2013.01); *H04H 60/13* (2013.01); *H04N 21/4345* (2013.01);
(Continued)

(58) Field of Classification Search
CPC ............. H04N 21/6581; H04N 21/478; H04N 21/8133; H04N 21/8586; H04N 21/235;
(Continued)

(56) References Cited

U.S. PATENT DOCUMENTS 6,574,795 B1 * 6/2003 Carr ................. H04N 7/088
                                                    348/E7.031
7,028,327 B1   4/2006 Dougherty et al.
(Continued)

FOREIGN PATENT DOCUMENTS

CN        101218819        7/2008
EP         1085758         3/2001
(Continued)

OTHER PUBLICATIONS

International Search Report and Written Opinion dated Jun. 17, 2013, in PCT/US2013/036075, filed Apr. 11, 2013.
(Continued)

*Primary Examiner* — Cynthia M Fogg
(74) *Attorney, Agent, or Firm* — Oblon, McClelland, Maier & Neustadt, L.L.P.

(57) ABSTRACT

Reception apparatus, method, computer-readable storage medium, and information providing apparatus for a trigger. The reception apparatus includes a tuner/demodulator and a processor. The tuner/demodulator is configured to receive content included in a transport stream from a content source. The transport stream includes a trigger associated with the content and references information included in the transport stream. The processor is configured to retrieve the trigger from the transport stream, and to retrieve the information from the transport stream based on the reference in the trigger.

21 Claims, 15 Drawing Sheets

Related U.S. Application Data continuation of application No. 13/782,730, filed on Mar. 1, 2013, now Pat. No. 9,113,230.

(60) Provisional application No. 61/636,488, filed on Apr. 20, 2012.

(51) Int. Cl.
*H04N 21/434* (2011.01)
*H04N 21/658* (2011.01)
*H04N 21/858* (2011.01)
*H04N 21/478* (2011.01)

(52) U.S. Cl.
CPC ....... *H04N 21/4348* (2013.01); *H04N 21/478* (2013.01); *H04N 21/6581* (2013.01); *H04N 21/8586* (2013.01)

(58) Field of Classification Search
CPC .. H04N 21/4302; H04N 21/435; H04N 21/43; H04N 21/4316; H04N 5/08; H04N 21/4722; H04N 21/242; H04N 21/4307; H04N 5/04; H04N 21/812; H04N 21/8126; H04N 21/23614; H04N 21/4884; H04N 21/488; H04N 21/8547; H04N 21/4345; H04N 21/4348; H04N 21/2343; H04N 21/41407; H04H 60/13; H04H 20/93; H04L 65/4069
USPC .......................................................... 725/32
See application file for complete search history.

(56) References Cited

U.S. PATENT DOCUMENTS

| | | | |
|---|---|---|---|
| 7,222,155 B1 | 5/2007 | Gebhardt et al. | |
| 7,861,259 B2 | 12/2010 | Barone, Jr. | |
| 7,889,964 B1 | 2/2011 | Barton et al. | |
| 8,925,016 B2 | 12/2014 | Eyer | |
| 2001/0003212 A1 | 6/2001 | Marler et al. | |
| 2002/0097235 A1 | 7/2002 | Rosenberg et al. | |
| 2002/0108121 A1 | 8/2002 | Alao et al. | |
| 2002/0162120 A1 | 10/2002 | Mitchell | |
| 2002/0188959 A1* | 12/2002 | Piotrowski | H04N 5/4401 725/112 |
| 2003/0023971 A1 | 1/2003 | Martinolich et al. | |
| 2003/0051253 A1 | 3/2003 | Barone, Jr. | |
| 2004/0010771 A1 | 1/2004 | Wallace et al. | |
| 2004/0010792 A1 | 1/2004 | Wallace et al. | |
| 2004/0010793 A1 | 1/2004 | Wallace et al. | |
| 2005/0005303 A1 | 1/2005 | Barone, Jr. et al. | |
| 2005/0028195 A1 | 2/2005 | Feinleib et al. | |
| 2005/0262539 A1 | 11/2005 | Barton et al. | |
| 2006/0190776 A1 | 8/2006 | Oostveen et al. | |
| 2006/0225093 A1 | 10/2006 | Huttunen et al. | |
| 2007/0022437 A1 | 1/2007 | Gerken | |
| 2007/0124796 A1 | 5/2007 | Wittkotter | |
| 2007/0136777 A1* | 6/2007 | Hasek | H04N 7/17318 725/114 |
| 2009/0034556 A1 | 2/2009 | Song et al. | |
| 2009/0317053 A1 | 12/2009 | Morley et al. | |
| 2009/0320064 A1 | 12/2009 | Soldan et al. | |
| 2010/0146376 A1 | 6/2010 | Reams | |
| 2010/0161757 A1* | 6/2010 | Suh | H04H 20/28 709/217 |
| 2010/0162307 A1 | 6/2010 | Suh et al. | |
| 2010/0186059 A1 | 7/2010 | Suh et al. | |
| 2010/0215340 A1 | 8/2010 | Pettit et al. | |
| 2010/0235537 A1 | 9/2010 | Kitazato | |
| 2011/0075990 A1 | 3/2011 | Eyer | |
| 2011/0088075 A1 | 4/2011 | Eyer | |
| 2011/0128443 A1 | 6/2011 | Blanchard et al. | |
| 2011/0221863 A1 | 9/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0258659 A1 | 10/2011 | Carney et al. | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2011/0314496 A1 | 12/2011 | Di Mattia et al. | |
| 2011/0321114 A1* | 12/2011 | Newell | H04N 21/234318 725/146 |
| 2012/0016876 A1 | 1/2012 | Oostveen et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0096043 A1* | 4/2012 | Stevens, Jr. | G06F 16/9024 707/798 |
| 2012/0185888 A1 | 7/2012 | Eyer et al. | |
| 2012/0189010 A1 | 7/2012 | Lee et al. | |
| 2012/0236113 A1 | 9/2012 | Eyer | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2012/0303745 A1* | 11/2012 | Lo | H04W 4/021 709/217 |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0254824 A1 | 9/2013 | Eyer | |
| 2014/0130077 A1 | 5/2014 | Oostveen et al. | |
| 2014/0259052 A1 | 9/2014 | Blanchard et al. | |
| 2015/0121432 A1* | 4/2015 | Pandey | H04N 21/25891 725/78 |
| 2015/0195605 A1 | 7/2015 | Eyer | |

FOREIGN PATENT DOCUMENTS

| | | |
|---|---|---|
| EP | 1 380 945 A2 | 1/2004 |
| KR | 10-2008-0035586 A | 4/2008 |
| KR | 10-2011-0103982 | 9/2011 |
| WO | WO 02071760 | 9/2002 |
| WO | WO 2005/006758 A1 | 1/2005 |
| WO | WO 2009134105 | 11/2009 |
| WO | WO 2011/066171 A2 | 6/2011 |
| WO | WO 2011/074218 A2 | 6/2011 |
| WO | WO 2013/012676 A1 | 1/2013 |

OTHER PUBLICATIONS

International Search Report and Written Opinion dated May 17, 2013 in PCT/US2013/030646 filed Mar. 13, 2013.
International Search Report and Written Opinion dated May 31, 2013 in PCT/US13/33133 filed Mar. 20, 2013.
Supplementary European Search Report for Application No. EP 12 82 9741, dated Mar. 12, 2015. (5 pages).
Paila, t., "FLUTE—File Delivery over Unidirectional Transport", Oct. 2004, Network Working Group—FRC 3926, HTT://tools.ietf.org/html/rfc3926, pp. 8-12.

(56) References Cited

OTHER PUBLICATIONS

Combined Office Action and Search Report dated Apr. 21, 2015 in Chinese Patent Application No. 201280026304.4 (with English language translation).
Extended European Search Report for Application No. 12 814551.3, dated Jun. 22, 2015. (5 pages).
Extended European Search Report for Application No. 12 814180.1, dated Jun. 30, 2015. (5 pages).
Extended European Search Report for Application No. 13764907.5, dated Jul. 27, 2015. (5 pages).
Extended European Search Report dated Oct. 12, 2015 in Patent Application No. 13765058.6.
Extended European Search Report dated Nov. 3, 2015 in Patent Application No. 13777548.2.
Office Action dated Jun. 25, 2018 in Korean Patent Application No. 10-2014-7001114 (with English language translation), 12 pages.
Office Action dated Jun. 25, 2018 in Korean Patent Application No. 10-2014-7001114 (with English language translation).
Korean Office Action dated Apr. 2, 2019 in Patent Application No. 10-2014-7026201 (with English translation) 8 pages.

\* cited by examiner

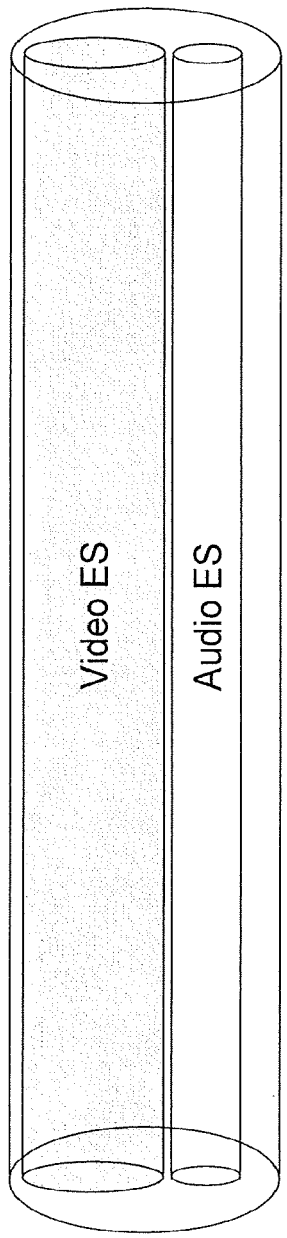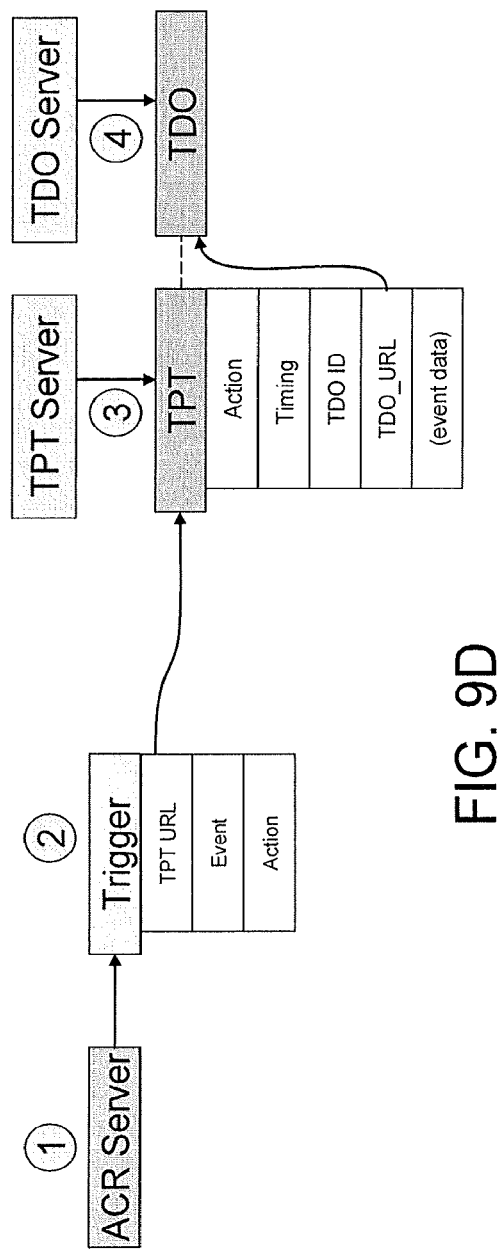
FIG. 9D

| Establish Media Timing | |
|---|---|
| Format | <domain_name>"/"<program_id>"?mt="<media_time> |
| Example | xbc.us/223?mt=200909 |
| Purpose | Signal location of TPT, establish media timing |
| Usage Examples | • Response from ACR server<br>• broadcast periodically throughout program to allow receivers to synchronize and pre-load interactive content<br>• Live and non-live content |

FIG. 10A

| Live Event Trigger | |
|---|---|
| Format | <domain_name>"/"<program_id>"?id="<trigger_id> |
| Example | xbc.us/223?id=9 |
| Purpose | Cause the TPT event identified in trigger_id to be immediately executed |
| Usage Examples | Live events |

FIG. 10B

| Type 3: Signal Upcoming Event Timing | |
|---|---|
| Format | <domain_name>"/"<program_id>" ?id="<trigger_id>"&et="<event_time> |
| Example | xbc.us/223?id=8&et=310909 |
| Purpose | • Schedule execution of TPT event identified in trigger_id – e.g. when media_time equals event_time;<br>• Allows precise, synchronized timing<br>• Decouples timing uncertainty of delivery of trigger from execution time |
| Usage Examples | • Live events<br>• Can be broadcast periodically throughout program to update timing of events in TPT |

FIG. 10C

METHOD, COMPUTER PROGRAM, AND RECEPTION APPARATUS FOR DELIVERY OF SUPPLEMENTAL CONTENT

CROSS-REFERENCE TO RELATED APPLICATIONS

The present continuation application claims the benefit of priority under 35 U.S.C. § 120 to application Ser. No. 14/704,554, filed on May 5, 2015, which is incorporated herein by reference in its entirety and is a continuation application of application Ser. No. 13/782,730 (now U.S. Pat. No. 9,113,230), filed on Mar. 1, 2013, which is incorporated herein by reference in its entirety and claims priority under 35 U.S.C. § 119(e) to U.S. provisional patent application No. 61/636,488, filed Apr. 20, 2012, which is incorporated herein by reference in its entirety. This application is related to U.S. provisional patent application No. 61/613,880, filed Mar. 21, 2012; and U.S. provisional patent application No. 61/578,631, filed Dec. 21, 2011, which are incorporated herein by reference in their entirety.

BACKGROUND OF THE INVENTION

Field of the Invention

Embodiments described herein relate generally to a method, computer-readable storage medium, and reception apparatus for delivery of supplemental content. More particularly, the embodiments described herein relate generally to delivery of data required to present the supplemental content within a broadcast emission.

Background

Modern televisions and set top boxes are capable of performing numerous functions in addition to receiving and presenting television broadcasts. Some functions include the display of an electronic programming guide (EPG), widgets that allow a television viewer to pull up web pages and tools right alongside programs being watched on a television, and the like. Many of these functions require that the television or set top box receive additional data.

SUMMARY OF THE INVENTION

According to an embodiment of the present disclosure, there is provided a method of a reception apparatus for processing a trigger. The method includes receiving content included in a transport stream from a content source. The transport stream includes a trigger associated with the content and references information included in the transport stream. The trigger is retrieved from the transport stream. Further, the information is retrieved from the transport stream based on the reference in the trigger.

Further, according to an embodiment of the present disclosure, there is provided a non-transitory computer-readable storage medium having instructions embedded therein, which, when executed by a computer, cause the computer to perform the method of the reception apparatus, as discussed above.

According to an embodiment of the present disclosure, there is provided a reception apparatus. The reception apparatus includes a tuner/demodulator and a processor. The tuner/demodulator is configured to receive content included in a transport stream from a content source. The transport stream includes a trigger associated with the content and references information included in the transport stream. The processor is configured to retrieve the trigger from the transport stream, and to retrieve the information from the transport stream based on the reference in the trigger.

Further, according to an embodiment of the present disclosure, there is provided an information providing apparatus. The information providing apparatus includes a multiplexer and a transmitter. The multiplexer is configured to generate a transport stream including content, a trigger associated with the content, and a trigger parameters table (TPT) referenced by the trigger. The TPT is retrieved by a reception apparatus based on the trigger and a File Delivery over Unidirectional Transport (FLUTE) File Delivery Table (FDT). The transmitter is configured to transmit the transport stream to the reception apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A-9D illustrate different embodiments for accessing supplemental content data by the reception apparatus based on the availability of a transport stream and access to one or more communication networks;

FIGS. 10A-10C illustrate exemplary compact triggers;

DETAILED DESCRIPTION

Figure 1:
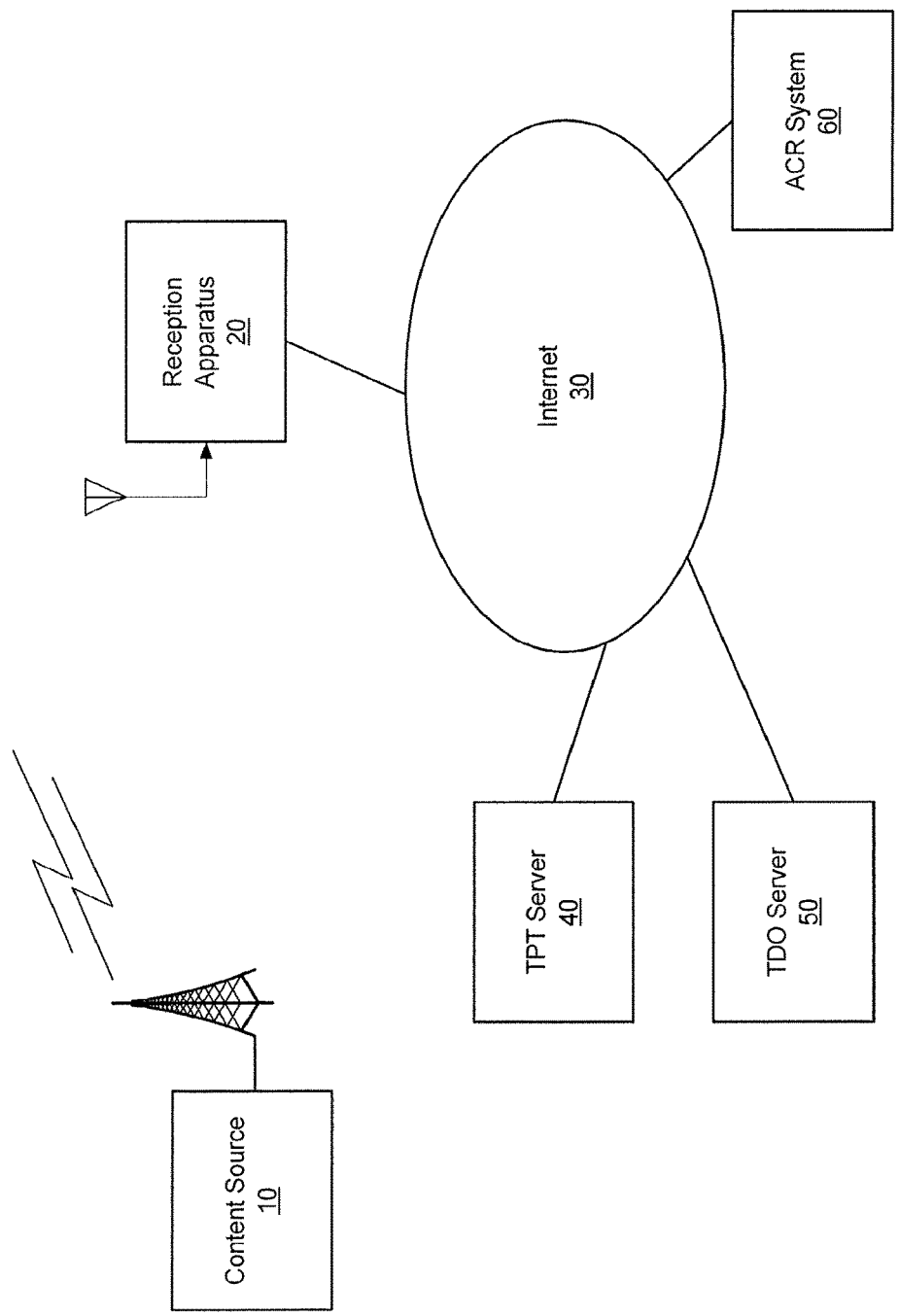
FIG. 1 illustrates an exemplary broadcast system including a content source, reception apparatus, trigger parameters table (TPT) server, triggered declarative object (TDO) server, and an automatic content recognition (ACR) system.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

In interactive television applications, viewers are offered supplemental content, in addition to the program audio and video, that allows them to interact with the programming in some way. The supplemental content could be as simple as an Internet uniform resource locator (URL) that points to a web site that can provide further information about the program, item, or service being shown. Or, the supplemental content could provide text and graphics that augment the program video. An example of the latter is an interactive element that displays a particular player's updated statistics during the course of a sporting event.

Often, the behavior or appearance/disappearance of these interactive elements is dependent on the timing of events within the program. Television receivers which render these objects must be able to receive the appropriate signaling to know how and when to make the adjustments to the display of the interactive elements. The objects which perform this signaling function may be called "triggers" because they act to trigger a certain operation at the designated time. The varieties of operations that may be triggered are endless. Simple examples include such things as "execute" (start the operation of the interactive function), "hide" (remove all visible elements from the display), perform some designated action such as display or update some text or graphic, and "terminate" (end all operations and release memory resources).

The trigger itself must be transported from the point in the distribution chain at which the interactive element is sourced and operated all the way to the consumer's receiver. A variety of transport methods are possible for the trigger object. The trigger can be included in the digital transport multiplex in one or a combination of different locations, or it can be provided by an Internet-based server and accessed by receivers that are Internet-connected.

Possible locations in the digital transport include in video or audio "user data," within the closed captioning transport, within a descriptor carried in a program specific information (PSI) table, within adaptation fields of the MPEG-2 Transport Stream packet, embedded in audio, and modulated within the video itself in luminance or chrominance. In each case, small triggers are preferable. For example, a trigger that can be represented in as few as 30 bytes (or characters of text) offers greater flexibility in transport and greater efficiency compared to one whose size might be 100 or more bytes. In embodiments of the present disclosure, supplemental content including interactivity is presented in which the trigger function is accomplished using a small, "short," or "compact" trigger.

Referring now to the drawings, FIG. 1 is a block diagram that shows an exemplary broadcast system 2, including a content source 10, a reception apparatus 20, a trigger parameters table (TPT) server 40, a triggered declarative object (TDO) server 50, and an optional automatic content recognition (ACR) system 60.

In one embodiment, the content source 10 provides content to the reception apparatus 20 via a terrestrial broadcast. In the case of audio/video content, the content is divided into a video elementary stream (ES) and an audio ES corresponding to the video and audio portions of the content. The video ES and audio ES are multiplexed with other data to form a broadcast multiplex, such as an MPEG-2 Transport Stream.

Figure 9A:
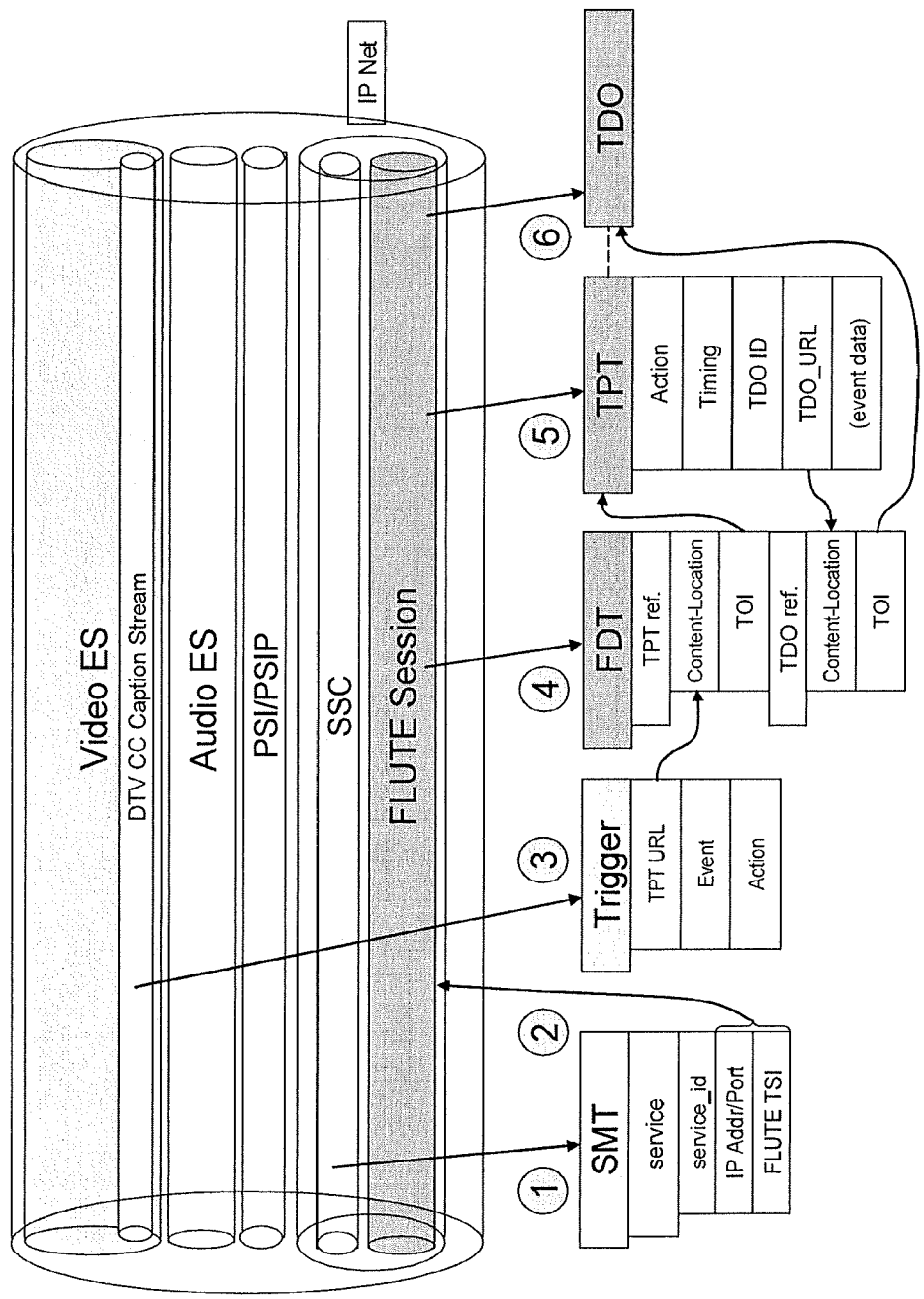

As illustrated in FIG. 9A, in one embodiment, the MPEG-2 Transport Stream includes one or a combination of a video ES; a digital television closed caption stream; an audio ES, Program-specific Information (PSI); Program and System Information Protocol (PSIP) information as specified in ATSC Document A/65, which is incorporated by reference in its entirety; and IP data packets corresponding to an IP subnet. In one embodiment, the IP subnet includes one or a combination of one or more Service Signaling Channels (SSC) and one or more File Delivery over Unidirectional Transport (FLUTE) sessions. FLUTE is defined in RFC 3926, which is incorporated by reference in its entirety. Further, the transfer of non-real-time content delivery via an MPEG-2 Transport Stream is described, for example, in "Working Draft: ATSC Candidate Standard: Non-Real-Time Content Delivery," S13-1-329r18 and ATSC Standard: Non-Real-Time Content Delivery Doc. A/103, May 9, 2012, which are incorporated herein by reference in their entirety.

In other embodiments, the content source 10 provides the content via at least one of a satellite broadcast, a cable television transmission, a terrestrial television broadcast, cellular network, and data communication network such as a local area network (LAN), wide area network (WAN), or the Internet 30. The content provided by the content source 10 includes one or more television programs, without regard to whether the content is a movie, sporting event, segment of a multi-part series, news broadcast, etc. Further, the content provided by the content source 10 may also include advertisements, infomercials, and other program-like content which may not be reported as a program in an EPG.

The broadcast system 2 provides an interactive digital television feature whereby a viewer is presented with supplemental content that is associated with, and/or synchronized in time to events within, content provided by the content source 10. The supplemental content includes one or a combination of media types such as audio, video, text, or an image, and/or one or more interactive elements and, in one embodiment, is communicated to the reception apparatus 20 via one or more broadcast parameters. In one embodiment, the behavior and appearance of the supplemental content is associated with, and synchronized in time to the events within, the content.

The manner in which the reception apparatus 20 accesses supplemental content, according to embodiments of the present disclosure, depends on various factors such as the availability of the transport stream, the availability of one or more communication networks, and the type of content (e.g., broadcast versus non-real-time content) reproduced by the reception apparatus 20. For example in some scenarios, only the uncompressed audio and video may be provided to the reception apparatus 20 for display; the transport stream may not be accessible. In other scenarios, a "partial" transport stream may be available, meaning that only the packets carrying compressed audio and video are present and other packets (carrying, for example the IP subnet, SSC, and FLUTE session) are not present. FIGS. 9A-9D illustrate four cases: (1) full transport stream is available, but a communication network (e.g., the Internet) is not accessible; (2) full transport stream is available and a communication network is accessible; (3) non-real-time (NRT) file playback and/or only a partial transport stream is available, and a communication network is accessible; and (4) the transport stream is not available, but a communication network is accessible.

As illustrated in FIG. 9A, in the first case, when supplemental content data are included in the transport stream, the reception apparatus 20 is able to access supplemental content via the transport stream, despite not having access to a communication network. In one embodiment, the supplemental content data are provided in one or more FLUTE sessions and are referenced and extracted using a FLUTE File Delivery Table (FDT) for example, in a manner similar to the manner in which non-real time services are provided in U.S. Pat. No. 8,099,752, patented Jan. 17, 2012, which is incorporated by reference in its entirety. Embodiments of the present disclosure, however, utilize the FLUTE/FDT itself, without requiring the use of a non-real-time information table (NRT-IT) or other similar "adjunct services table."

Figure 5:
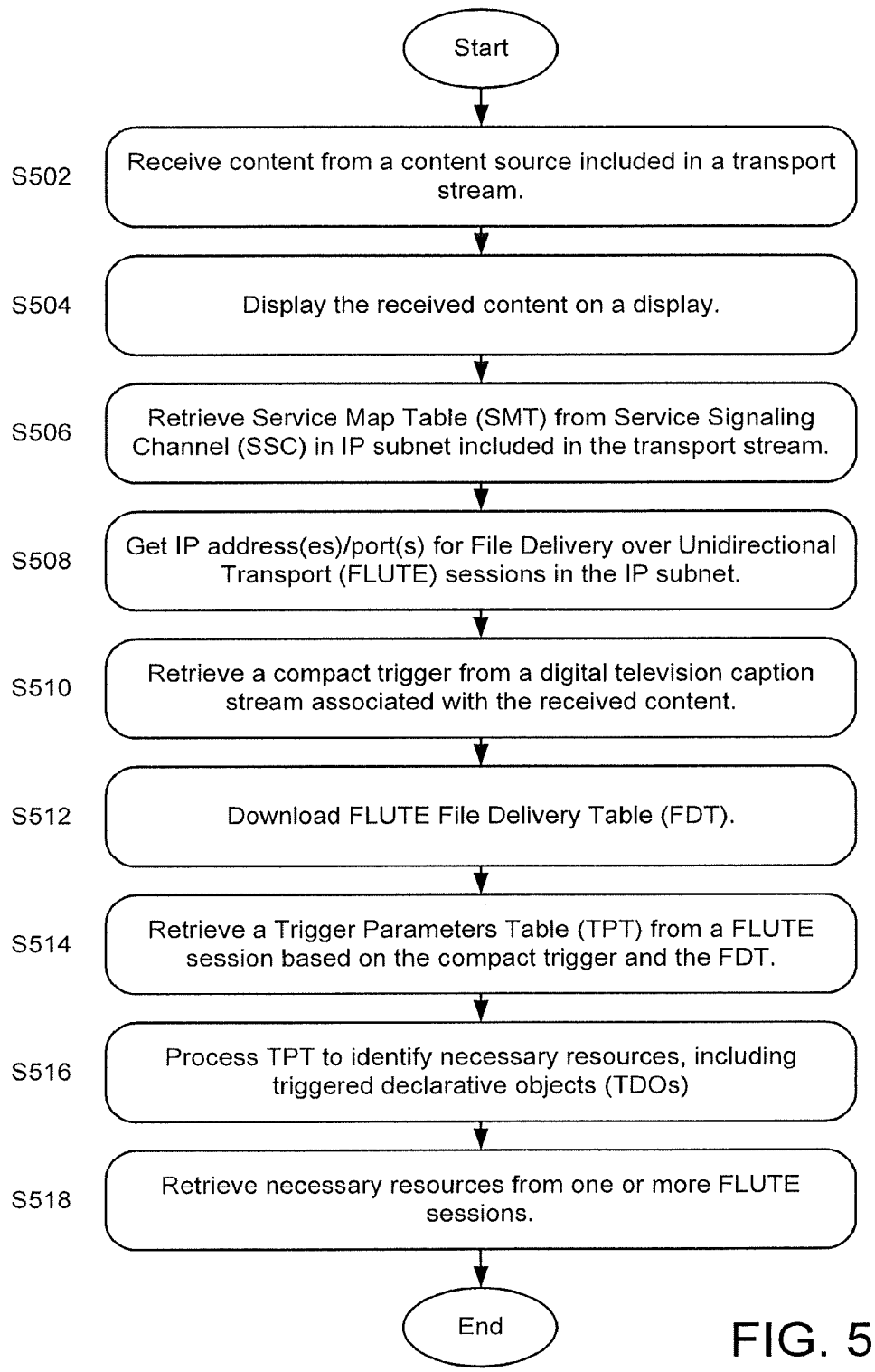
FIG. 5 illustrates a flow diagram of an exemplary method for processing a compact trigger.

An exemplary method for extracting the supplemental content data is illustrated in FIG. 5, which is discussed in more detail below. This allows broadcasters the ability to optionally offer supplemental content, and interactive experiences, to users who do not have Internet access, but do have access to the transmitted signal (e.g., by means of an antenna and a tuner-demodulator), by placing supplemental content files within a broadcast file system in addition to, or in lieu of, an Internet server.

Figure 9B:
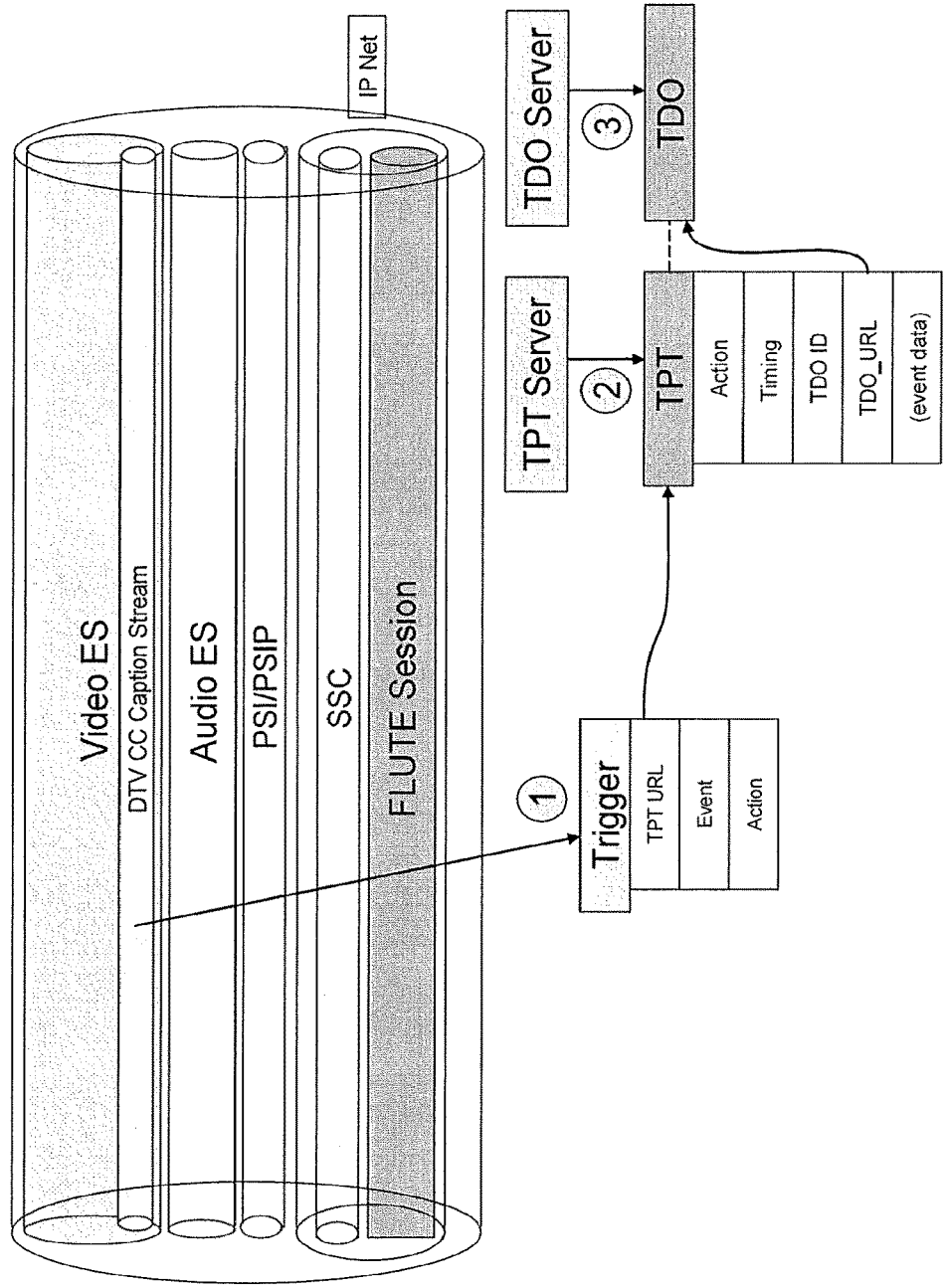

As illustrated in FIG. 9B, in the second case, when the full transport stream is available and the reception apparatus 20 has access to a communication network, the reception apparatus 20 is configured to retrieve a trigger for the supplemental content from the transport stream and supplemental content data based on the trigger via the communication network by, for example, accessing the TPT server 40 and/or the TDO server 60. In other embodiments, the reception apparatus 20 is configured to retrieve the supplemental content data from the full transport stream as an alternative, or in addition, to retrieving the supplemental content data using the communication network.

When the reception apparatus 20 is configured to retrieve the supplemental content data from both the full transport stream and the communication network, in one embodiment, the reception apparatus 20 is configured to attempt to retrieve the supplemental content data first from one of the full transport stream and the communication network and, if unsuccessful, to subsequently retrieve the supplemental content data from the other of the full transport stream and the communication network. In another embodiment, both retrieval methods may be initiated simultaneously. The reception apparatus 20 can conclude both methods when the content data is retrieved via either.

Figure 9C:
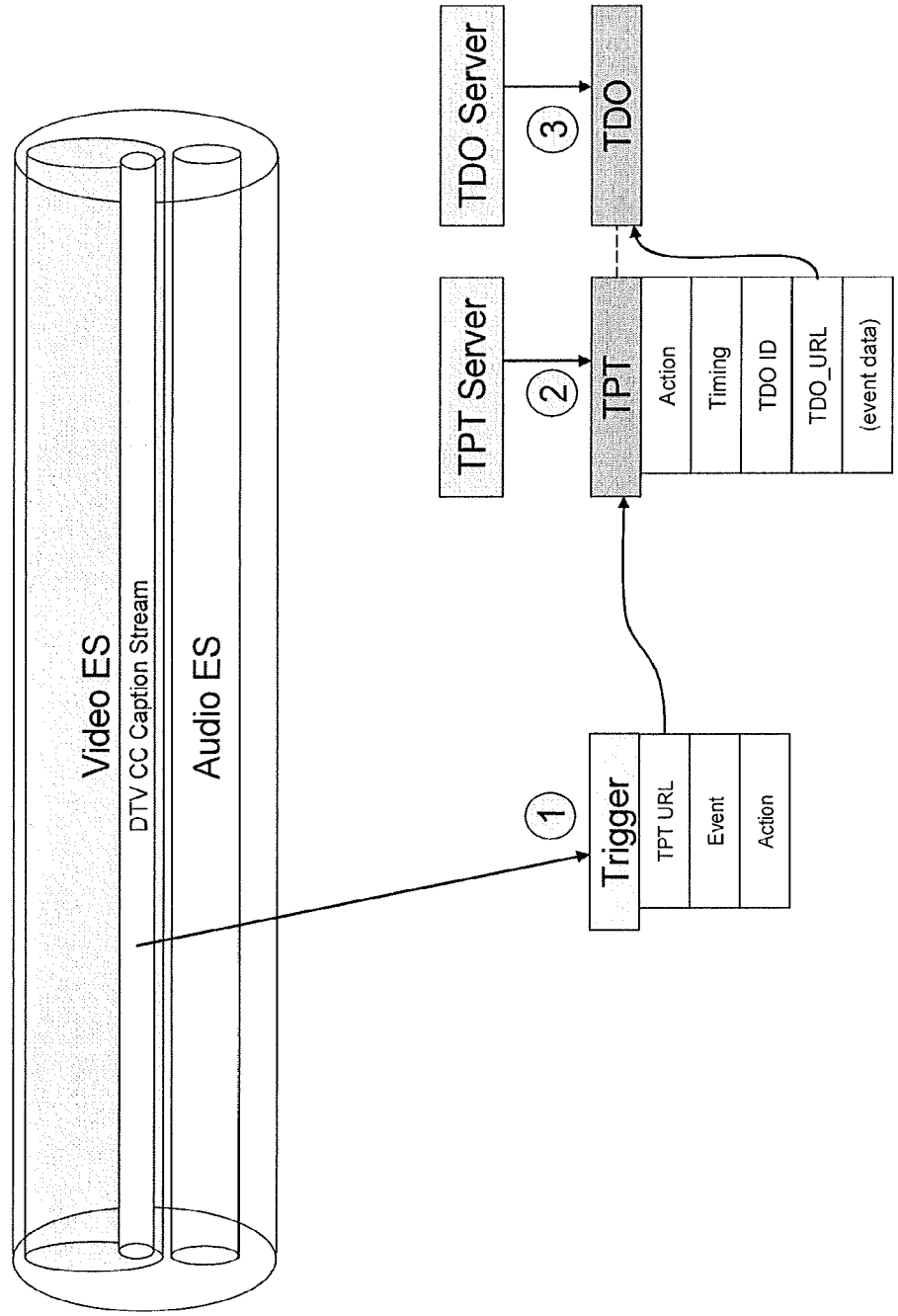
Figure 11:
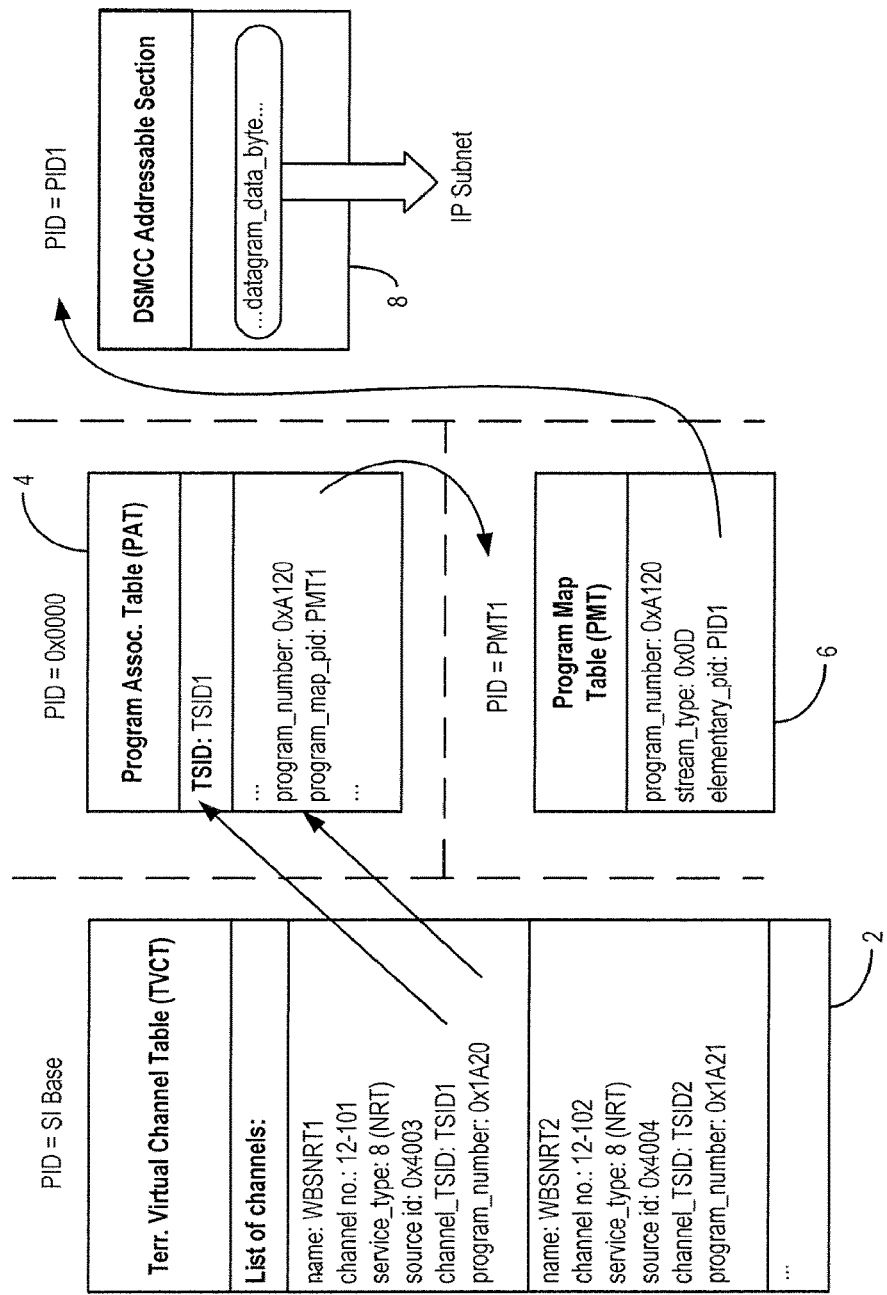
FIG. 11 is an exemplary diagram depicting delivery of IP packets via a digital television broadcast.

As illustrated in FIG. 9C, in the third case, when the reception apparatus 20 plays back an NRT file and/or only a partial transport stream (e.g., only the video/audio elementary and closed caption streams) is available, the reception apparatus 20 retrieves a trigger from the partial transport stream and the supplemental content data from the communication network based on the trigger. It is noted that the closed caption stream need not be available to the reception apparatus 20 when the trigger is included in another accessible location within the transport stream. However, access to other parts of the transport stream such as the PSI table may be required based on the location of the trigger. For example, the reception apparatus 20 obtains supplemental content data such as one or a combination of a TPT from the TPT server 40 and a TDO from the TDO server 60.

As illustrated in FIG. 9D, in the fourth case, when the transport stream is not available and the reception apparatus 20 has access to a communication network, the reception apparatus 20 in one embodiment obtains the trigger from an ACR response provided by the ACR system 60, as described for example in U.S. provisional patent application No. 61/549,775, filed Oct. 21, 2011, which is incorporated by reference in its entirety.

As noted above, the manner in which the reception apparatus 20 accesses supplemental content data varies based on factors such as the availability of the transport stream, the type of content being played back, and the accessibility of one or more communication networks. In one embodiment, the reception apparatus 20 is configured to handle each of the cases noted above. In other embodiments, the reception apparatus is configured to handle any one or a combination of the above-noted cases.

Figure 3:
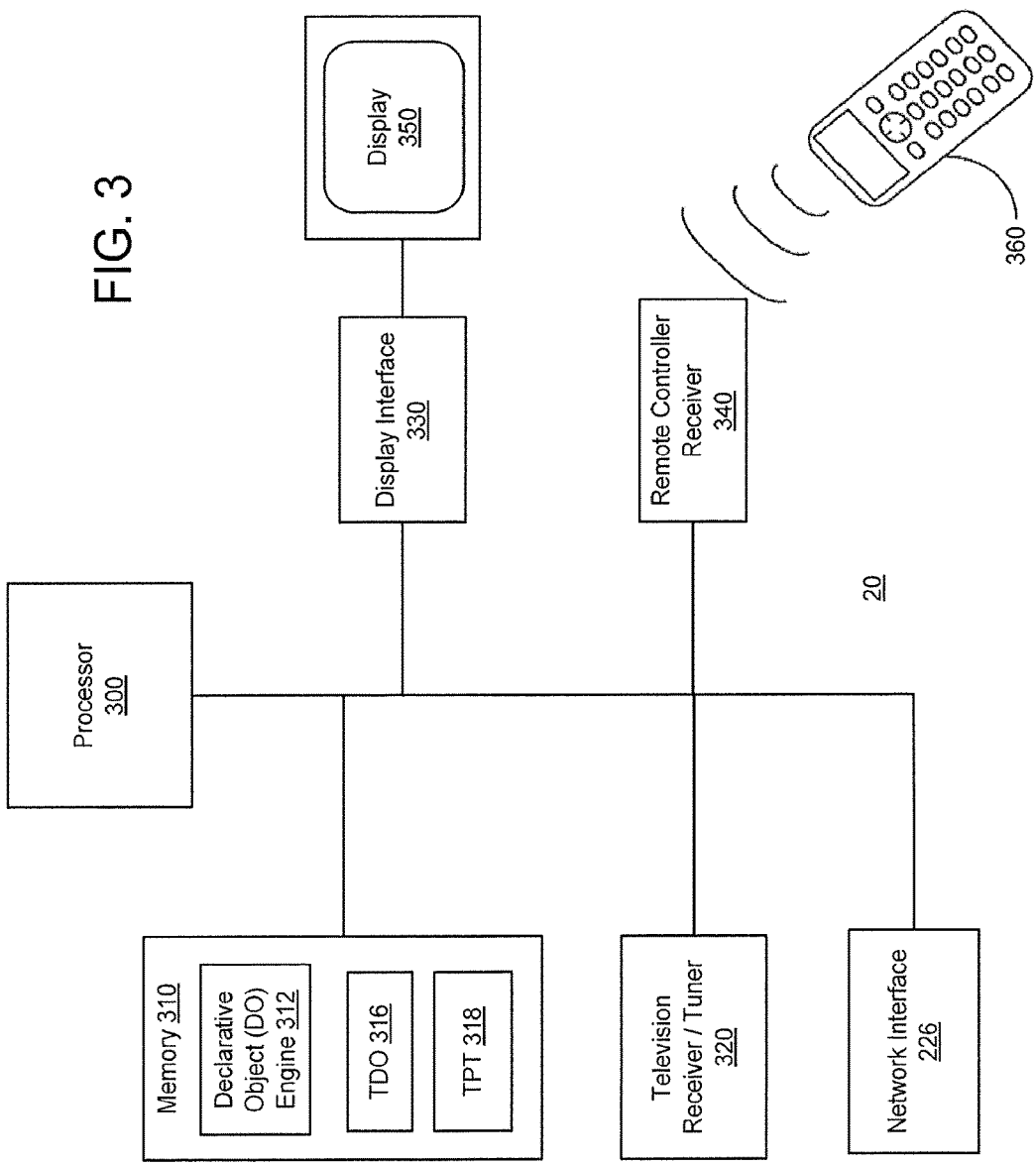
FIG. 3 is a processor-centric block diagram of an exemplary reception apparatus.

The reception apparatus 20 receives the content provided by the content source 10 and presents the content on a display 350, as illustrated in FIG. 3. In one embodiment, the display 350 is an integral part of the reception apparatus 20 such as a television set. Alternatively, the display 350 may be external to the reception apparatus 20 such as a television set connected to a set top box.

According to one embodiment, the reception apparatus 20 includes a Declarative Object (DO) Engine that accepts declarative objects (DOs) and renders them along with the content (e.g., audio/video content of a program) received from the content source 10. The DO Engine renders a DO in response to a specific request from a user or in response to a trigger event. A DO that is rendered in response to a trigger event is referred to as a triggered declarative object (TDO).

The TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959,529 filed Dec. 3, 2010 entitled "Announcement of Triggered Declarative Objects" to Blanchard et al. which is hereby incorporated by reference in its entirety. However, the TDO is not limited to the structure described in Blanchard et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player (e.g., the DO Engine) typically supports a scripting language that is an object-oriented programming language. The TDOs, in examples shown herein, are received from a content or service provider in advance of the time they are executed so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

The trigger is a data object, which is optionally bound to a particular item of content (e.g., a television program) that references a specific TDO instance, or set of TDO instances, by the use of a file name or directory path identifier for an object or objects that have already been downloaded. Certain TDOs will only make sense in conjunction with certain content. An example is a TDO that collects viewer response data, such as voting on a game show or contest.

In one embodiment, the DO Engine receives triggers tied to coincide with various points (e.g., trigger events) in the content such as a scene change or the beginning or ending of an ad segment. The triggers are divided into two command types: (1) those that are processed by the DO Engine (referred to as triggers associated with type 1, lifecycle, or DO Engine commands), and (2) those that are passed by the DO Engine to the TDO for processing (referred to as triggers associated with type 2 or DO event commands). The triggers associated with a type 1 command are associated with, for example, commands to be executed by the DO Engine. The triggers associated with a type 2 command are associated, for example, with parameters (e.g., commands, data, etc.) to be processed within the DO itself to effect changes in appearance, behavior, or state of associated supplemental content.

As noted above, a trigger may be transported within a broadcast emission stream as described, for example, in U.S. patent application Ser. No. 13/216,375, which is incorporated herein by reference in its entirety. For example, a trigger may be transported in a Packetized Elementary Stream (PES) in an MPEG-2 Transport Stream (TS). A trigger may also be transported via other paths such as the Internet. In one embodiment, when the trigger is not available via the broadcast emission stream, the reception apparatus 20 acquires the trigger via the ACR system 60 by, for example, sending A/V samples of the content being received by the reception apparatus 20 to the ACR system 60. In other embodiments, the trigger is embedded in the content itself. For example, the trigger may be embedded in an audio or a video portion of the content and recovered by processing of the decoded audio or the video in the reception apparatus 20.

To reduce the size of the trigger, a subset or all of the parameters associated with the trigger are provided to the reception apparatus 20 separately, instead of being included in the trigger itself. For example, as illustrated in FIG. 9A, the parameters associated with the trigger are provided in a TPT transported in a FLUTE session included in the transport stream. The TPT can also be provided in other portions of the transport stream such as along with EPG data, provided via the Internet by the TPT server 40, and the like.

The TPT includes a primary key (e.g., a tag element) that associates each element (row) in the table with an associated trigger event. Each trigger, in turn, will refer to a particular event in the TPT by means of this key.

In one embodiment, the reception apparatus 20 is configured to receive updated versions of a TPT when available. The capability to receive an updated version of the TPT provides increased flexibility in providing trigger events when it is difficult to determine the exact timing of trigger events ahead of time, such as in the case of live programming. During the live programming, the TPT can be updated to include timing information once it has been determined. For example, updated versions of the TPT may include modified or new timing information associated with a trigger for displaying supplemental content during the live programming. In another example, the TPT can be updated to refer to different content based on the outcome of the live event. An example of a method for updating the TPT is via the exemplary compact trigger illustrated in FIG. 10C. However, it is noted that the TPT need not actually be updated with the information included in the compact trigger to execute a command associated with the associated scheduled event.

In another embodiment, the TPT remains unchanged as the program progresses. The timing of execution of specific interactive events is determined by the appearance of a trigger referencing a specific event. When the receiving apparatus 20 receives a trigger, the event referenced in the TPT is executed. An example of the trigger referencing the specific event is the exemplary compact trigger illustrated in FIG. 10B.

While some forms of the trigger can indicate that the time is right for the TDO to perform a certain action, a series of timed actions can be played out without a trigger. The TPT optionally provides timing information for various interactive events relative to "media time." Each item of interactive content has a timeline for its playout; an instant of time on this timeline is called media time. For example, a 30-minute program may have an interactive event at media time ten minutes and 41 seconds from the beginning of the program, or media time 10:41. The TPT can include an entry indicating the details of the event that is to occur at time 10:41. Once the reception apparatus 20 determines the current timing relative to the start of the program, it can use the TPT to play out all subsequent events.

In one embodiment, the reception apparatus 20 determines the media time based on the exemplary compact trigger illustrated in FIG. 10A. For example, the reception apparatus 20 determines the media time internally and uses the media time defined in the compact trigger for synchronization purposes or as a reference point to determine the elapsed time at any point of the received content (e.g., a television program). It should be noted that the media time is not limited to the inclusion of minutes and seconds and can use any other increments of time or reference points such as frames to designate the timing of the events.

The reception apparatus 20 may determine the availability of an updated TPT by referring to a non-real-time (NRT) file in a FLUTE session, such as a file version number indicated in a Transport Object Identifier (TOI). In another embodiment, the reception apparatus 20 periodically accesses a source of the TPT, such as a predetermined FLUTE session, to determine whether a new TPT is available.

Figure 2:
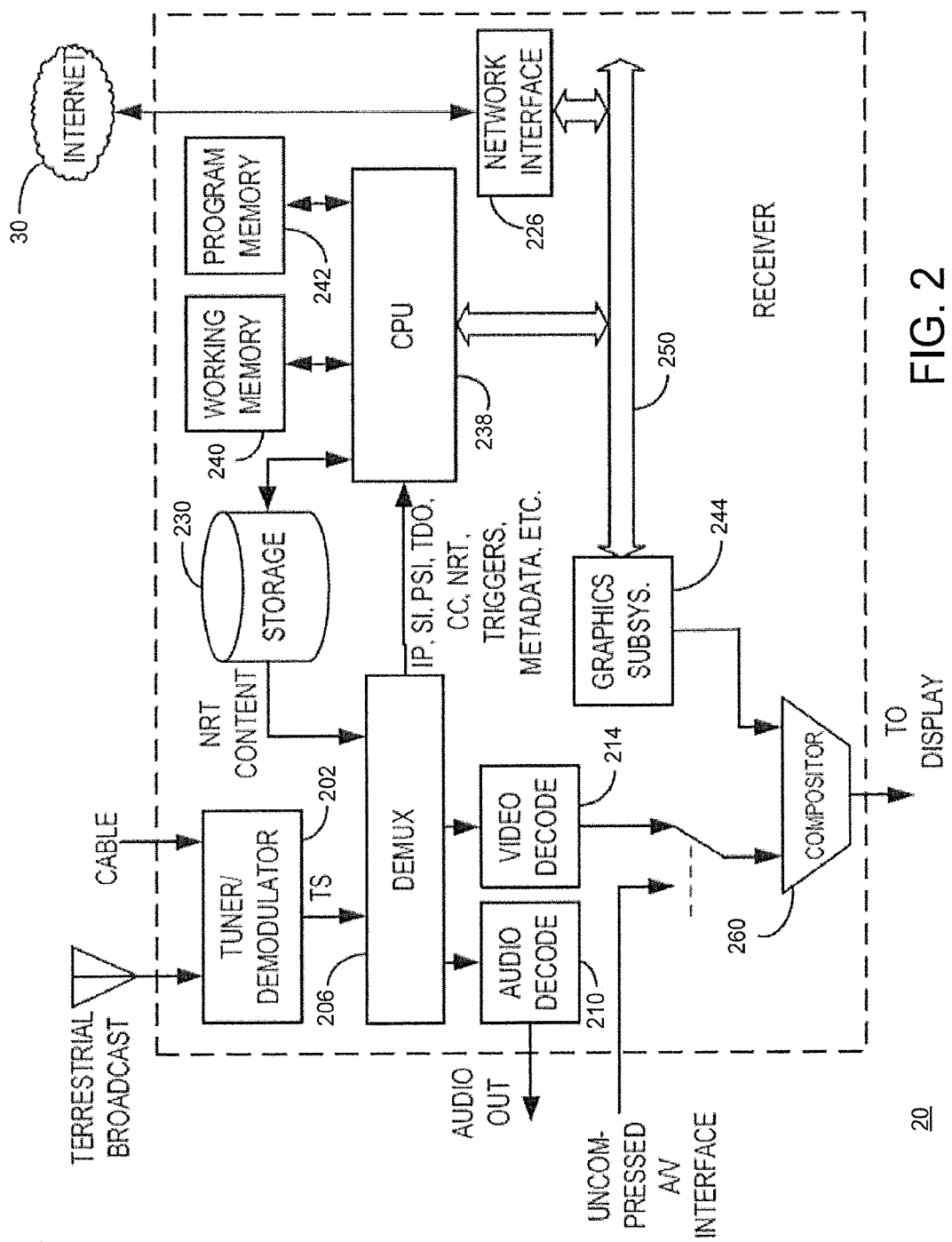
FIG. 2 is a block diagram of an exemplary reception apparatus.

FIG. 2 illustrates an embodiment of the reception apparatus 20. The reception apparatus 20 is a digital television receiver device that is incorporated into a television set or a set top box. The reception apparatus 20 includes a tuner/demodulator 202, which receives content from one or more content sources such as a terrestrial broadcast or a cable television transmission. The reception apparatus 20 may also, or alternatively, receive content from a satellite broadcast. The tuner/demodulator 202 receives a transport stream (TS), which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface) that can be selectively utilized.

In one embodiment, the TS includes ancillary information such as one or more of caption data and supplemental content data such as TDOs, triggers, TPTs, etc., which are separated out by the demultiplexer 206. However, the A/V content and/or the ancillary information may be received via the Internet 30 and a network interface 226.

A storage unit 230 is provided to store NRT or Internet-delivered content such as Internet Protocol Television (IPTV). The stored content can be played by demultiplexing the content stored in the storage unit 230 by the demultiplexer 206 in a manner similar to that of other sources of content. The storage unit 230 may also store one or more TDOs, triggers, and TPTs acquired by the reception apparatus 20.

The reception apparatus 20 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other information such as TDO announcements and EPGs used for rendering graphics, and passes the information to the graphics subsystem 244. The graphics outputted by the graphics subsystem 244 are combined with video images by the compositor and video interface 260 to produce an output suitable for display on a video display.

Further, the CPU 238 operates to carry out functions of the reception apparatus 20 including the processing of related triggers, TDOs, TPTs, and browser operations. The browser operations include accessing a service specified by a URL given by the TDO or trigger. The CPU 238 further operates to execute script objects (control objects) contained in the TDO, its trigger(s), etc., using for example the DO Engine.

Although not illustrated in FIG. 2, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

A more processor-centric view of the reception apparatus 20 is illustrated in FIG. 3. Memory and storage 230, 240, and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM). When a TDO 316 is received, the TDO 316 is stored in the memory 310. The TDO execution is carried out by a DO Engine 312. The TDO, when executed by the DO Engine 312 presents supplemental content based on one or more triggers and/or TPT entries associated with the TDO. The memory 310 also stores a TPT 318, which in one embodiment, defines one or more parameters for each trigger associated with the TDO.

Figure 4:
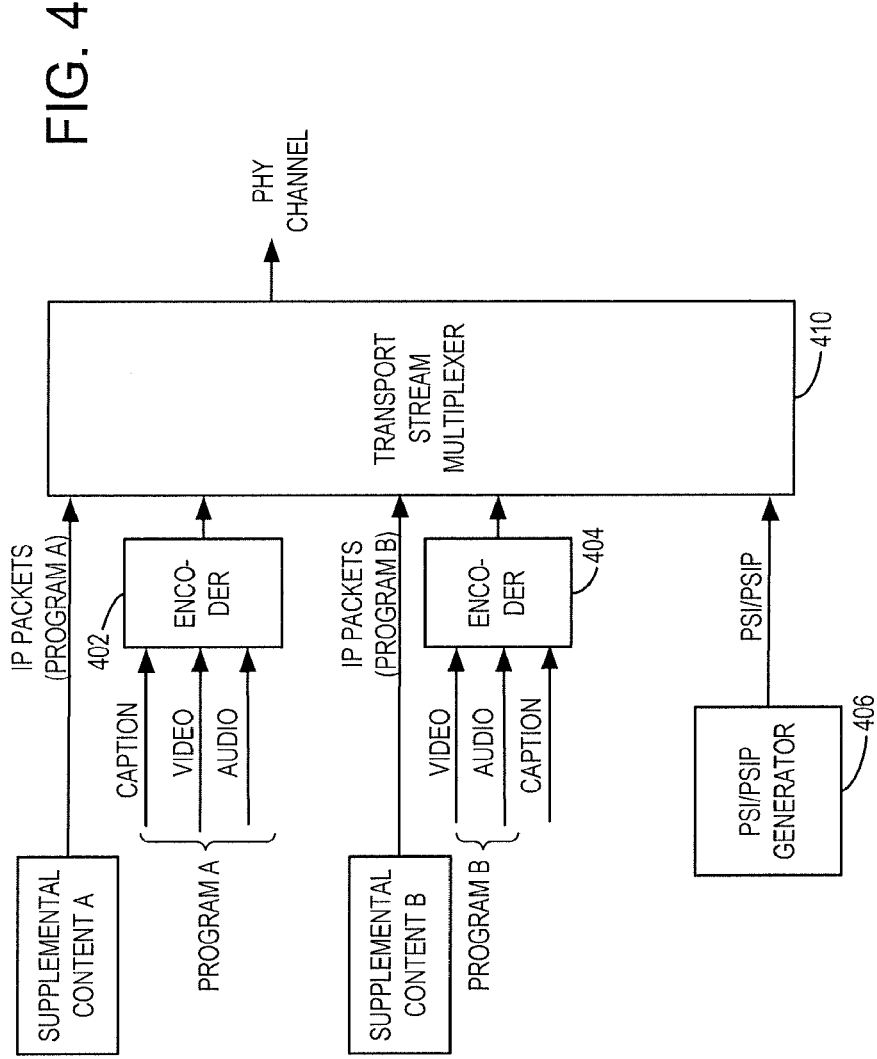
FIG. 4 is an exemplary basic diagram of a content source consistent with certain embodiments of the present disclosure.

Referring now to FIG. 4, a basic diagram of the content source 10 (e.g., a service provider such as a broadcaster) is depicted. Generally speaking, a single service provider may provide multiple programs over one or more transport streams. For example, a transport stream can include content programming for both channel 5 and channel 6, or in the ATSC system, for both channels 4.1 and 4.2. The audio, video, and caption data are provided to an encoder which encodes the data into packets suitable for distribution, including caption data packets. As shown, Program A and Program B are encoded by encoders 402 and 404 which are then provided to a transport stream multiplexer 410. Further supplemental content data for the programs are provided as IP packets for the respective program. PSI/PSIP data are also provided to the transport stream multiplexer 410. The PSI/PSIP data, in one embodiment, are generated by a PSI/PSIP generator 406. In another embodiment, the PSI data for each of the programs is generated by their respective encoders, and only the PSIP data is generated by the generator 406. The transport stream multiplexer 410 then provides an output that can be processed for distribution via a physical channel medium such as a terrestrial, cable, or satellite broadcast.

FIG. 5 provides an overview of an exemplary method for processing triggers by, for example, the reception apparatus 20. In step S502, the reception apparatus 20 receives content (e.g., a television program) by tuning to the content included in a transport stream from a content source, such as the content source 10. The received content is presented to the user of the reception apparatus 20, in step S504. In step S506, the reception apparatus 20 retrieves a Service Map Table (SMT) from a Service Signaling Channel (SSC) corresponding to the content being presented. The SSC is provided in an IP subnet included in the transport stream. In one embodiment, the reception apparatus 20 accesses the SSC through a Terrestrial Virtual Channel Table (TVCT) included in the PSIP, an associated Program Association Table (PAT), an associated Program Map Table (PMT), and a Digital Storage Media Command and Control (DSM-CC) addressable section to access the IP subnet.

While FIG. 5 depicts a sequence of process steps, it should be noted that the equivalent result may be obtained by performing some of the steps in a different order. For example, a reception apparatus 20 could retrieve the SMT before displaying any received content on the display (step S506 executed before S504). As another example, the retrieval of the compact trigger in step S510 could precede any of steps S504 through S508 without any effective change in the results. The necessary steps, in general terms, are to retrieve the compact trigger, match it with a file or files in the FLUTE FDT, and to retrieve the associated files from the FLUTE session. Preliminary to recovery of files from the FLUTE session, the reception apparatus 20 must identify the transport stream packets carrying the IP subnet, access the Service Signaling Channel to find the Service Map Table, and process the SMT to find the IP address and port of the FLUTE session.

Figure 12:
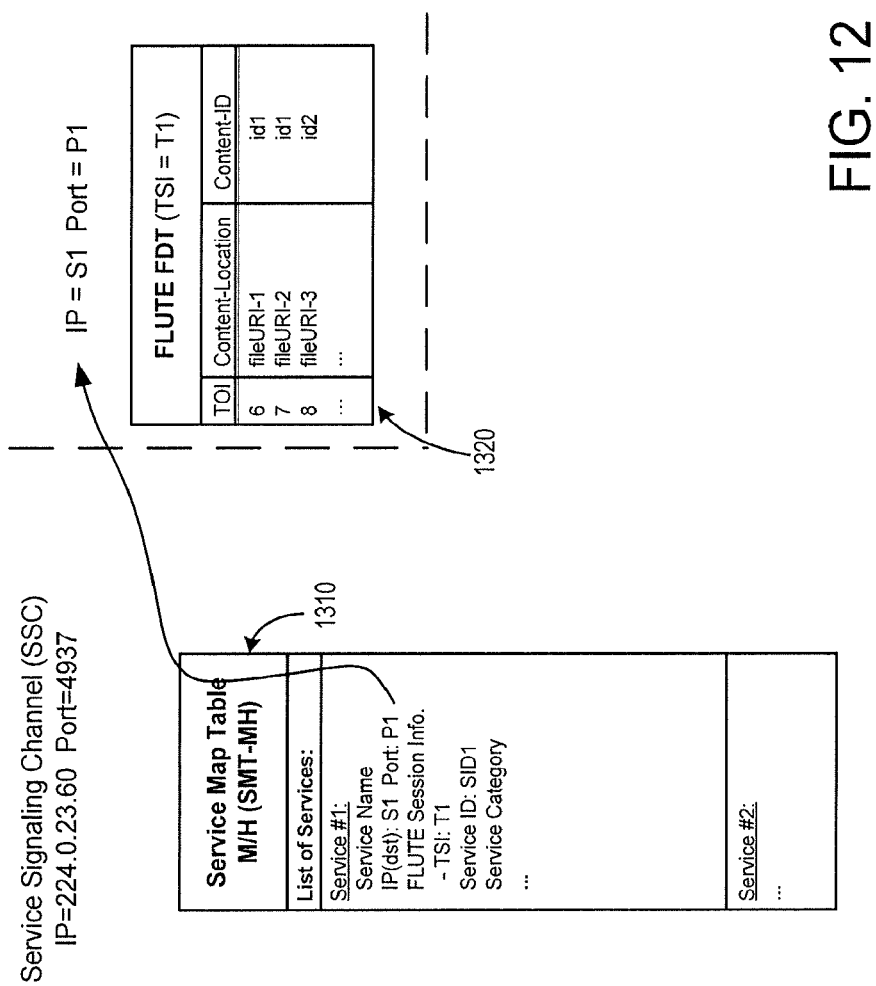
FIG. 12 is an exemplary diagram depicting the linkage between a Service Map Table (SMT) and a File Delivery over Unidirectional Transport (FLUTE) File Delivery Table (FDT).

As illustrated in FIG. 12, in one embodiment, the reception apparatus 20 retrieves an SMT 1310 by identifying packets associated with a predetermined identifier such as a predetermined IP address/Port number (e.g., IP=224.0.23.60, Port=4937). The SMT 1310 is linked to a FLUTE FDT 1320 via one or a combination of a destination IP address, port number, and FLUTE Transport Session Indicator (TSI) value. Accordingly, the reception apparatus 20 determines an IP address/Port number of any FLUTE sessions associated with the presented content based on the SMT.

In step S510, the reception apparatus 20 receives a compact trigger associated with the received content. As noted above, the compact trigger can be included in the digital transport multiplex in a variety of different locations. In one embodiment, the compact trigger is delivered within a digital television closed caption channel associated with the content being displayed by the reception apparatus 20, as described for example in U.S. provisional patent application No. 61/613,869, filed Mar. 21, 2012, which is incorporated herein in its entirety. In other embodiments, the compact trigger is included in the IP subnet such as a FLUTE session, acquired from the ACR system 60, etc.

An FLUTE File Delivery Table (FDT) is downloaded in step S512. The FLUTE FDT is an IP packet-based directory of files that includes a content identifier that identifies content present in IP packets elsewhere in the IP packet stream. The FDT identifies entries via "Content-Location"

which is a uniform resource identifier (URI) as described for example, in RFC 2396, which is incorporated by reference in its entirety.

As illustrated in FIGS. 9A and 12, the FDT includes one or more "Content-Location" entries. The "Content-Location" entry is used by a compact trigger to reference one or more content items in the FDT associated with the presented content. In one embodiment, metadata carried in the FLUTE FDT is used as linkage between the compact trigger and the FDT. Specifically, using the directory portion of the compact trigger (the portion excluding the "query" portion ["?" and terms following]) to match against a "Content-Location" entry in the FDT. In other embodiments, another field in the FDT could be used to perform the match, Thus, the compact trigger can reference one or more content items in an FDT associated with the presented content.

As described above, in one embodiment, the TPT is delivered in a FLUTE file structure within the broadcast multiplex, within an IP subnet, where IP packets are tunneled within MPEG-2 Transport Stream packets. In step S514, the reception apparatus 20 processes the compact trigger and retrieves a TPT from a FLUTE session based on the compact trigger and the FDT. For example, the reception apparatus 20 uses the domain name+program ID portion of the compact trigger to reference content carried in an FLUTE session. Specifically, the reception apparatus 20 determines a corresponding content identifier in the FDT to identify the location of the referenced content.

In step S516, the reception apparatus 20 processes the TPT to identify necessary resources, including referenced supplemental content data such as interactive elements including TDOs, other file-based multimedia content, and data. As illustrated in FIG. 9A, for example, an embodiment of the TPT includes identifiers (e.g., a TDO URL) that are also matched with a "Content-Location" entry in the FDT to identify a location of the corresponding supplemental content data (e.g., TDO) in the IP subnet. The necessary resources are retrieved from the broadcast multiplex in step S518. The retrieval of the necessary resources may or may not be responsive to the receipt of subsequent triggers by the reception apparatus 20. Subsequently, the reception apparatus 20 continues to process compact triggers from the caption stream.

In the exemplary method of FIG. 5, by retrieving the compact trigger, TPT, and other supplemental content data such as referenced interactive elements (e.g., TDOs, other file-based multimedia content and data), and any other necessary information from the broadcast multiplex, supplemental content can be provided to a user that may or may not have Internet access. Thus, embodiments of the present disclosure overcome a problem wherein a user desiring to access supplemental content has no Internet access, but does have access to the broadcast transport stream. Delivery of the supplemental content (e.g., all files) in FLUTE in the broadcast emission solves this problem while preserving the benefits of using a compact trigger and TPT mechanism.

In one embodiment, the compact trigger provides one or a combination of the following functions: (1) identifies the location of the TPT, (2) indicates media timing (i.e., where in playout we are), (3) identifies an event to execute now or later, and (4) includes the capability of indicating a parameter to smooth server peak load. Further, in one embodiment, the compact trigger includes one or a combination of the following contents: (1) URL of the TPT Server or any other identifier of the TPT Server, or an identifier of an entry in an FDT (e.g., "Content-Location" entry), (2) media time, (3) trigger event ID, (4) new time of specified TPT event, and (5) "diffusion timing" to reduce the peak load on the Internet servers.

The diffusion timing is included in the compact trigger when a large number of receivers need to access content at the same time over a communication network. Accordingly, when the content is available via both the transport stream and over the communication network, the reception apparatus 20 in one embodiment disregards the diffusion timing information when retrieving the content from the transport stream. For example, a first instance of a compact trigger for an advertisement or program may direct all receivers tuned to that channel to access one or more files from a server at the same time. The diffusion timing allows the requests from the receivers to be spread out while ensuring that the one or more files are delivered to each of the receivers in a timely manner.

Further, the diffusion timing information may or may not be included in subsequent compact triggers for the advertisement or program. The diffusion timing information may not be needed in subsequent triggers since all the receivers would already have downloaded the one or more files, the exception being receivers that have just tuned into the advertisement or program.

An exemplary format of the compact trigger is as follows:
xbc.tv/7a1?mt=200909

In the exemplary format, "xbc.tv" refers to a domain name registered to an entity that will provide content associated with the compact trigger, such as interactive elements. "/7a1" refers to a name/directory space managed by a registered owner of the domain. That is, "/7a1" is a location of the relevant content within the designated domain. In one embodiment, "/7a1" corresponds to a program ID portion of the compact trigger. Thus, "xbc.tv/7a1" identifies a server/directory where the associated content (e.g., the interactive elements, a TPT, etc.) will be found. When the compact trigger is used to access supplemental content data included in the transport stream and/or the supplemental content data is only provided in the transport stream, "xbc.tv/7a1" need not identify an actual server/directory where the associated can be found.

The "?mt=200909" term corresponds to a parameter portion, which is used to identify for example the media time, event (e.g., trigger event ID), timing updates (e.g., new time of specified TPT event), diffusion timing, etc. The "mt" portion identifies the particular term; in this case, it is a "media time" parameter. Generally speaking, a variety of different query terms may be defined for the compact trigger in addition to those mentioned here. The command identifier portion is not limited to two characters; it may be one or more characters in length.

In addition, multiple different query terms may be included in the compact trigger, as specified in the Internet standards. When multiple query terms are present in the URI, each is separated from the other by an ampersand ("&") character.

In one embodiment, the parameter portion of the compact trigger does not include any parameters. An exemplary format of such a compact trigger is as follows: xbc.us/9b2. A compact trigger without any parameters can be useful in situations such as when the content provider wants to pre-notify one or more receivers that they should collect the tables or any other information in the referenced directory because they likely will be needed in the short-term. In some embodiments of the present disclosure, a compact trigger without any parameters is used to identify a "Content-Location" entry in the FDT.

Exemplary compact triggers are illustrated in FIGS. 10A-10C. FIG. 10A illustrates a first compact trigger for establishing media timing. In one embodiment, the reception apparatus 20 uses the media timing as a reference to track an elapsed time of currently received content and to determine the location of an associated TPT. Exemplary usages of the first compact trigger include as a response from an ACR server, periodic broadcasts throughout a program to allow receivers to synchronize and pre-load interactive content, and live and pre-authored content.

FIG. 10B illustrates a second compact trigger for a live event. When the reception apparatus 20 receives the second compact trigger, the reception apparatus 20 causes the TPT event identified in the trigger_id to be immediately executed.

FIG. 10C illustrates a third compact trigger for signaling upcoming event timing. When the third compact trigger is received by the reception apparatus 20, the reception apparatus 20 schedules execution of a TPT event identified in the trigger_id based on the event_time. In one embodiment, the execution of the TPT event is scheduled for when the media time of the received content is equal to the event_time defined in the third compact trigger. Exemplary usages of the third compact triggers include live events and periodic broadcasts throughout a program to update timing events in the TPT.

Figure 6:
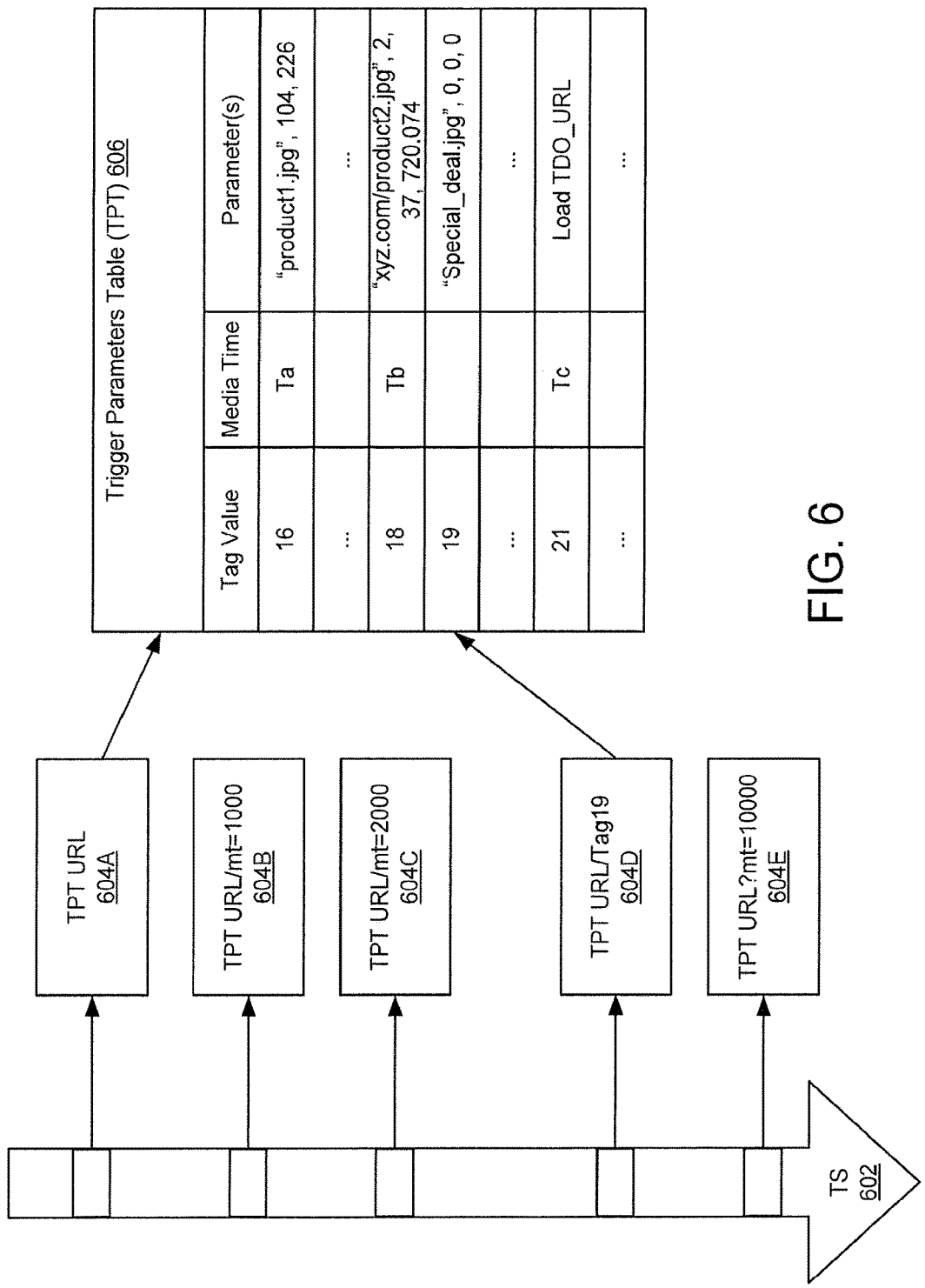
FIG. 6 illustrates exemplary triggers and an associated TPT.

FIG. 6 illustrates an example of a TPT that is retrieved from the transport stream in response to receipt of a trigger identifying the TPT (e.g., trigger 604A). As illustrated in FIG. 6, a TS 602 carrying content has associated with it a plurality of events associated with, for example, user interactivity and/or the display of additional content. Each event has one or more corresponding triggers or entries in the TPT. Further, in one embodiment, each of the triggers is associated with a TDO.

As noted above, in one embodiment, the triggers are divided into triggers associated with two different types of commands. A trigger associated with a type 1 command is processed by the DO Engine, while a trigger associated with a type 2 command is processed by a TDO. In FIG. 6, triggers 604A and 604E are examples of triggers associated with type 1 commands, and triggers 604B-604D are examples of triggers associated with type 2 commands. Triggers associated with either type 1 or type 2 commands may be used to retrieve a TPT from an FLUTE session, as described above. As illustrated in FIG. 9A, for example, the TPT itself can contain a reference to the FDT to retrieve an associated TDO from an FLUTE session.

In one embodiment, triggers associated with a type 2 command are associated with a row (or element) in the TPT, such as TPT 606, and include a reference to a specific entry in the TPT using, for example, a tag value. However, the reference to the TPT entry is not limited to a tag value and can be any symbol or representation that can be used to reference an entry in the TPT. Certain triggers such as a subset or all of the triggers associated with type 1 commands (e.g., triggers 604A and 604E), or a subset or all of the triggers associated with type 2 commands, need not have corresponding entries in the TPT corresponding to the trigger_ids identified in the respective triggers.

When receiving the trigger associated with a type 1 command, the DO Engine 312 performs a command identified by that trigger. For example, when the reception apparatus 20 receives a trigger 604A, the reception apparatus 20 retrieves a TPT associated with a "Content-Location" matching the TPT URL from the transport stream, if necessary. Subsequent triggers including the TPT URL can be used to establish play out timing (e.g., triggers 604B, 604C, and 604E). The trigger used to retrieve the TPT may or may not include media time information.

As mentioned, the function of the trigger may, in addition to identifying the location of the TPT, be only to establish the playout timing of the content it accompanies. Pre-produced (non-live) programming will likely use this model. In such a case, triggers carry media time samples (e.g., triggers 604B, 604C, 604E) that the reception apparatus 20 uses to synchronize its playout clock. The TPT includes references to specific values of media time associated with different interactive events. For example, the TPT could indicate that event_id 18 should be executed when media time value Tb (e.g., 977,803 milliseconds) is reached. The event associated with event_id value 18 may be either a type 1 or a type 2 command.

Any other tag values, symbols, or representations may be reserved for DO Engine commands. Further, in other embodiments, the triggers associated with a type 1 command may refer to the TPT 606 or another TPT to provide any parameters required to execute a command. For example, when the trigger is associated with a type 1 command that is "load TDO," the trigger includes the location (e.g., a URL), or a reference to the location (e.g., entry in a TPT), of the TDO so that it can be acquired by the reception apparatus 20. That is, a trigger associated with a type 1 command may include a reference to an entry in a TPT that identifies the location of a TDO such as the entry associated with tag value 21 and/or other necessary data to be retrieved and executed.

The DO Engine extracts a tag value for the trigger associated with a type 2 command and provides the extracted tag value to a currently executed TDO. The TDO uses the tag value to determine at least one parameter that is associated with the trigger. Then, as noted above, the TDO performs a function based on the retrieved at least one parameter. In another embodiment, the DO Engine provides the at least one parameter to the TDO.

The TPT 606 illustrated in FIG. 6 contains references to image files. Additional examples of the TPT are illustrated in U.S. provisional patent application No. 61/578,631. As illustrated in FIG. 6, one graphic is associated with each tag value 16, 18, and 19. However, the TPT 606 is not so limited and can refer to one or a combination of different media types such as audio, video, or an image, and/or one or more interactive elements. Further, as noted above, predetermined tag values (e.g., below 16) may be specified in a standard as commands to be executed by the DO Engine.

For example, when the reception apparatus 20 receives a trigger 604B with a tag value of 16, the DO Engine passes the tag value 16 to the currently executing TDO. The DO Engine passes the tag value by calling a Trigger API function and delivers the tag value to the TDO. The Trigger API function may be included in the DO Engine or a separate programming component of the reception apparatus 20. The TDO consults the TPT 606 and determines the parameters associated with the trigger are "product1.jpg" and the numbers 104 and 226. In one embodiment, the function performed by the TDO based on the determined parameters includes rendering the image file "product1.jpg" at location X, Y (104, 226) on the display 350.

The TPT, however, is not limited to including information on image files and position, and can include other parameters such as (as mentioned) a media time that designates the timing of any given interactive events, validity information for defining an expiration date of the trigger, capability codes that allow the reception apparatus 20 to determine whether it is capable of providing the supplemental content associated with the TPT or a specific TPT entry, etc. For example, the TPT may include one or more capability codes that indicate the TPT can only be processed by a reception apparatus supporting "ATSC 2.7+," a minimum requirement code such as support for certain media formats and decoders, essential and non-essential capabilities, etc.

Note that, in one embodiment, the DO Engine itself does not try to interpret anything carried in a given row of the TPT instance, such as the row identified with Tag Value 19 in TPT 606. The information contained in the TPT instance is known and interpretable only to the TDO it is designed to work with. Therefore, the number and types of parameters included in a TPT may be customizable based on the requirements of an associated TDO. In other words, the TPT is not limited to including a predetermined set of parameters and may contain any parameter that is required by a particular TDO.

Figure 7:
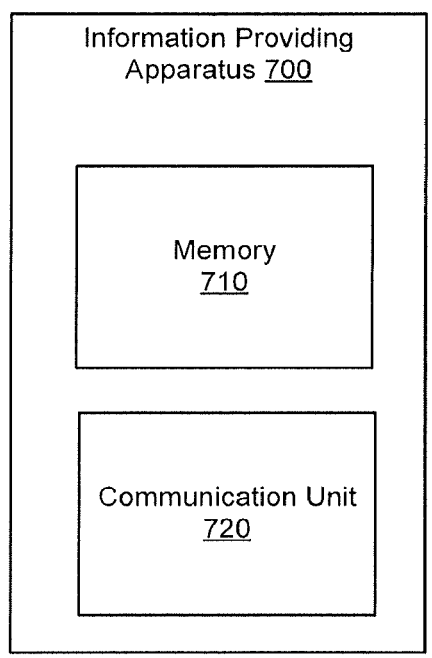
FIG. 7 is a block diagram of an exemplary information providing apparatus.

FIG. 7 illustrates an information providing apparatus 700, which may be included in the content source 10. As illustrated in FIG. 7, the information providing apparatus 700 includes a memory 710 and a communication unit 720. The memory 710 can be implemented using disc storage form as well as other forms of storage such as non-transitory storage devices including for example network memory devices, magnetic storage elements, magneto-optical storage elements, flash memory, core memory and/or other non-volatile storage technologies. Further, the communication unit 720 can be implemented using any one or a combination of a terrestrial broadcast transmitter, a cable broadcast transmitter, a satellite uplink transmitter, a network interface (e.g., WLAN card, Ethernet card, etc.), or the like.

The memory 710 is configured to store supplemental content data such as a TPT, TDO, and the like. In one embodiment, the TPT is associated with at least one TDO and includes at least one parameter associated with a trigger event. The communication unit 720 provides the TPT stored in the memory 710 to the reception apparatus 20. For example, the communication unit 720 provides the TPT to the reception apparatus 20 via the TS.

Figure 8:
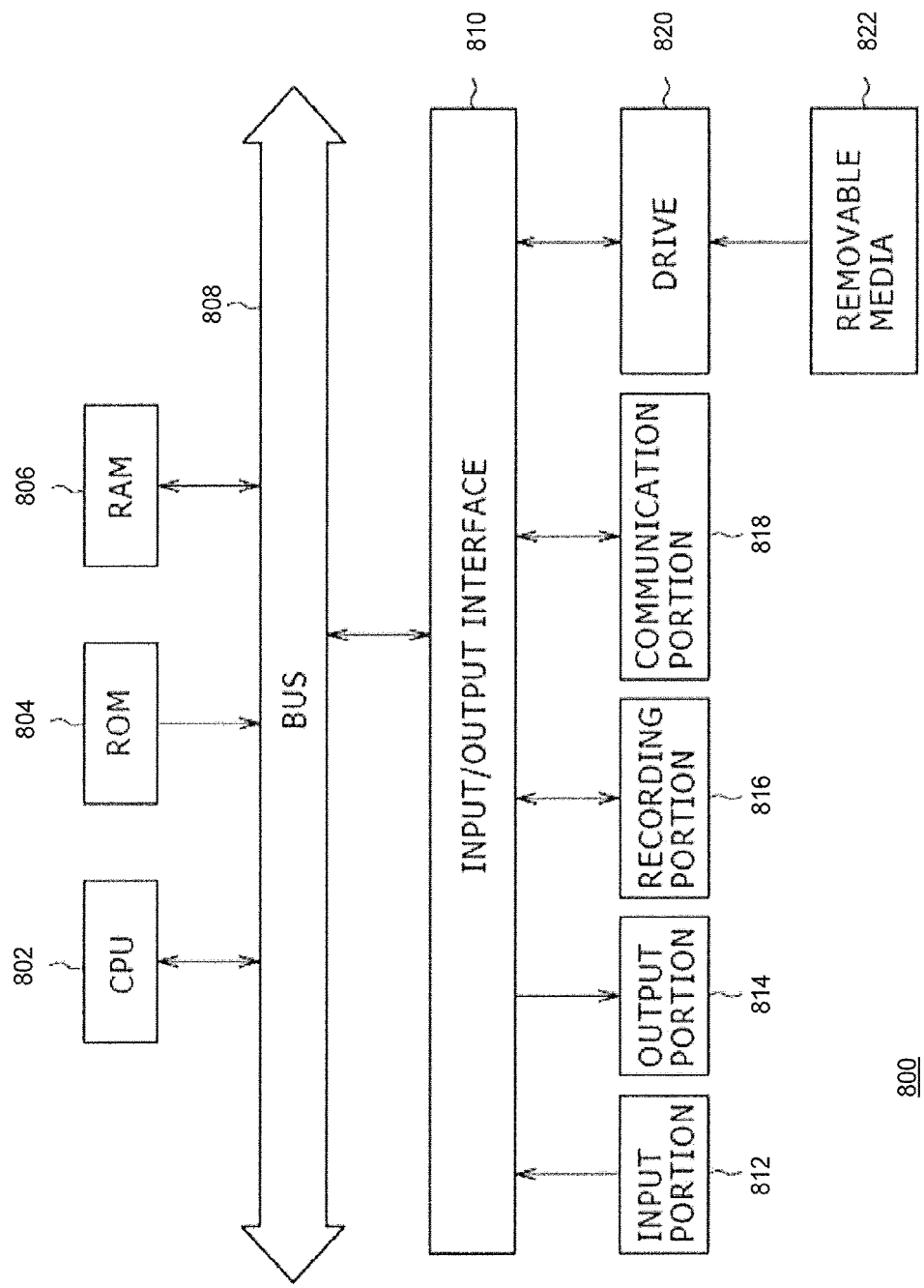
FIG. 8 is an exemplary computer.

FIG. 8 is a block diagram showing an example of a hardware configuration of a computer 800 configured to function as any one or a combination of the content source 10, reception apparatus 20, TPT server 40, TDO server 50, ACR system 60, and information providing apparatus 700.

As illustrated in FIG. 8, the computer 800 includes a central processing unit (CPU) 802, read only memory (ROM) 804, and a random access memory (RAM) 806 interconnected to each other via one or more buses 808. The one or more buses 808 is further connected with an input-output interface 810. The input-output interface 810 is connected with an input portion 812 formed by a keyboard, a mouse, a microphone, remote controller, etc. The input-output interface 810 is also connected to a output portion 814 formed by an audio interface, video interface, display, speaker, etc.; a recording portion 816 formed by a hard disk, a non-volatile memory, etc.; a communication portion 818 formed by a network interface, modem, USB interface, fire wire interface, etc.; and a drive 820 for driving removable media 822 such as a magnetic disk, an optical disk, a magneto-optical disk, a semiconductor memory, etc.

According to one embodiment, the CPU 802 loads a program stored in the recording portion 816 into the RAM 806 via the input-output interface 810 and the bus 808, and then executes a program configured to provide the functionality of the one or combination of the content source 10, reception apparatus 20, TPT server 40, TDO server 50, ACR system 60, and information providing apparatus 700

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the invention may be practiced otherwise than as specifically described herein.

The invention claimed is:

1. A reception apparatus, comprising:
circuitry configured to
receive content from a broadcast source for presentation of the content;
receive parameter information prior to executing or presenting supplemental content associated with the presentation of the content, the parameter information including location information, timing information, and capability information, the location information being associated with the supplemental content, and the capability information indicating a capability requirement for executing or presenting the supplemental content;
obtain the supplemental content based on the location information; and
execute or present the supplemental content associated with the presentation of the content at a timing determined based on the timing information when the reception apparatus is determined to be capable of executing or presenting the supplemental content according to the capability information.

2. The reception apparatus according to claim 1, wherein the circuitry is further configured to:
receive, from the broadcast source, triggering information; and retrieve the parameter information based on a resource location indicated by the received triggering information.

3. The reception apparatus according to claim 2, wherein the circuitry is further configured to:
retrieve the triggering information from a predetermined location of a transport stream.

4. The reception apparatus according to claim 2, wherein the circuitry is further configured to:
retrieve the triggering information from a digital television caption stream.

5. The reception apparatus according to claim 1, wherein the circuitry is further configured to:
receive the parameter information via a unidirectional transport session.

6. The reception apparatus according to claim 1, wherein the parameter information further includes additional data, and
the circuitry is configured to execute or present the supplemental content further based on the additional data included in the parameter information.

7. The reception apparatus according to claim 1, wherein the reception apparatus is a television set.

8. A method of executing or presenting supplemental content by a reception apparatus, comprising:
receiving content from a broadcast source for presentation of the content, the supplemental content being associated with the presentation of the content;
receiving, by circuitry of the reception apparatus, parameter information prior to executing or presenting the supplemental content, the parameter information including location information, timing information, and capability information, the location information being associated with the supplemental content, and the capability information indicating a capability requirement for executing or presenting the supplemental content;
obtaining, by the circuitry of the reception apparatus, the supplemental content based on the location information; and
executing or presenting the supplemental content associated with the presentation of the content at a timing determined based on the timing information when the reception apparatus is determined to be capable of executing or presenting the supplemental content according to the capability information.

9. The method according to claim 8, further comprising:
receiving, from the broadcast source, triggering information; and
retrieving the parameter information based on a resource location indicated by the received triggering information.

10. The method according to claim 9, further comprising:
retrieving the triggering information from a predetermined location of a transport stream.

11. The method according to claim 9, further comprising:
retrieving the triggering information from a digital television caption stream.

12. The method according to claim 8, further comprising:
receiving the parameter information via a unidirectional transport session.

13. The method according to claim 8, wherein
the parameter information further includes additional data, and
the executing or presenting the supplemental content is performed further based on the additional data included in the parameter information.

14. The method according to claim 8, wherein the reception apparatus is a television set.

15. A non-transitory computer-readable storage medium having embedded therein instructions, which when executed by a reception apparatus, cause the reception apparatus to perform a method of executing or presenting supplemental content, the method comprising:
receiving content from a broadcast source for presentation of the content, the supplemental content being associated with the presentation of the content;
receiving parameter information prior to executing or presenting the supplemental content, the parameter information including location information, timing information, and capability information, the location information being associated with the supplemental content, and the capability information indicating a capability requirement for executing or presenting the supplemental content;
obtaining the supplemental content based on the location information; and
executing or presenting the supplemental content associated with the presentation of the content at a timing determined based on the timing information when the reception apparatus is determined to be capable of executing or presenting the supplemental content according to the capability information.

16. The non-transitory computer-readable storage medium according to claim 15, wherein the method further comprises:
receiving, from the broadcast source, triggering information; and
retrieving the parameter information based on a resource location indicated by the received triggering information.

17. The non-transitory computer-readable storage medium according to claim 16, wherein the method further comprises:
retrieving the triggering information from a predetermined location of a transport stream.

18. The non-transitory computer-readable storage medium according to claim 16, wherein the method further comprises:
retrieving the triggering information from a digital television caption stream.

19. The non-transitory computer-readable storage medium according to claim 15, wherein the method further comprises:
receiving the parameter information via a unidirectional transport session.

20. The non-transitory computer-readable storage medium according to claim 15, wherein
the parameter information further includes additional data, and
the executing or presenting the supplemental content is performed further based on the additional data included in the parameter information.

21. The non-transitory computer-readable storage medium according to claim 15, wherein the instructions are configured to be executed by the reception apparatus, and the reception apparatus is a television set.

* * * * *